United States Patent [19]

Nearhoof

[11] 3,858,433

[45] Jan. 7, 1975

[54] BASELINE COMPENSATOR FOR DIFFERENTIAL THERMAL ANALYZER

[75] Inventor: Harold J. Nearhoof, State College, Pa.

[73] Assignee: The Carborundum Company, Niagara Falls, N.Y.

[22] Filed: Oct. 12, 1973

[21] Appl. No.: 406,127

[52] U.S. Cl. .............................................. 73/15 B
[51] Int. Cl. ......................................... G01h 25/00
[58] Field of Search .......................... 73/15 B, 361

[56] References Cited
UNITED STATES PATENTS
3,059,471 10/1969 Calvet.................................. 73/15
3,473,382 10/1969 Tabeling............................. 73/15

*Primary Examiner*—Herbert Goldstein
*Attorney, Agent, or Firm*—David E. Dougherty; Raymond W. Green

[57] ABSTRACT

Four thermocouples are connected electrically in series in order to measure small differences in temperature between a specimen object and a reference object within a thermally controlled environment. One pair of thermocouples in direct thermal contact with specimen and reference objects, respectively, registers a net difference in temperature between the specimen object and the reference object. The net voltage produced by this first pair of thermocouples is proportional to the difference in temperature between the specimen object and the reference object due to both (1) the evolution or absorption of heat, and (2) the differences in the respective thermal environments. A second pair of thermocouples registers the difference in ambient temperature between locations near the first and second thermocouples. All four thermocouples are then connected in series, so that the differential measured by the second pair of thermocouples, when electrically subtracted from the differential measured by the first thermocouples, leaves a temperature differential value which is independent of extraneous temperature differences in the thermally controlled environment.

11 Claims, 7 Drawing Figures

BASELINE COMPENSATOR FOR DIFFERENTIAL THERMAL ANALYZER

BACKGROUND OF THE INVENTION

This invention relates to a baseline compensator for a differential thermal analyzer.

A differential thermal analyzer is an analytical device comprising a thermally controlled environment, and adapted so that one may measure small differences in temperature between a specimen object and a reference object within a thermally controlled environment. An example of a situation in which this analytical tool may be useful would be the study of a phase diagram of a combination of materials. For example, samples of combinations of two end member components, in various proportions, can be prepared and each subjected to differential thermal analysis. By slowly raising the temperature of the environment surrounding each sample, and successively measuring differentials in temperature between the samples and a standard reference object of similar thermal mass at various temperatures, it can be accurately determined at what temperatures phase changes occur within each sample, since at this temperature the sample will lag slightly behind the temperature of the reference object. Likewise, it may be desired to study the temperature differential which is caused by an exothermic or endothermic reaction which occurs at a particular temperature. By slowly raising the temperature of a specimen object which is to react to the reaction temperature, and recording not only the temperature of the specimen object but also the difference between the temperature of the specimen object and a reference object, one can determine the temperature at which a reaction occurs, as well as the extent of the reaction. Since one knows the amount of the specimen object which is being measured, by measuring the precise differential in temperature, one can calculate the amount of heat which was generated at a particular temperature. This applies both to chemical reactions which occur at various temperatures and to physical changes such as the transformation solid to liquid or from one crystal structure to another.

In the past, differential thermal analyzers have comprised a pair of thermocouples electrically connected in series, one thermocouple being thermally connected to the specimen object and a second thermocouple being thermally connected to a reference object. These two thermocouples were electrically connected in series such that the difference in temperature between the location of the first thermocouple (the specimen object) and the location of the second thermocouple (the reference object) could be measured, since similar terminals of the two thermocouples were adjacent in the electrical circuitry. Thus, the first thermocouple tended to produce a change in potential in one direction due to the temperature of the specimen object, and the second thermocouple tended to produce a change in potential in the opposite direction, due to the temperature of the reference object. The resultant difference in temperature was taken as the difference in temperature due to the condition of the sample, e.g., reflecting the heat which might be generated or absorbed due to a phase change within the sample.

This system proved to be less than ideal, since in addition to recording the differential in temperature caused by activity within the specimen object, differences in environmental temperature were also included.

SUMMARY OF THE INVENTION

These deficiencies of the differential thermal analyzers of the prior art are overcome in accordance with the present invention, which provides a device for measuring small differences in temperature between a specimen object and a reference object within a thermally controlled environment, comprising at least four thermocouples (or other thermal sensing elements which produce a potential across their terminals as a function of temperature). The first thermocouple has a junction whch is thermally in contact with the specimen object whose temperature is to be compared with the temperature of the reference object within the thermally controlled environment. The second thermocouple has a junction which is removed from the specimen object and thermally in contact with the reference object, the junction of the second thermocouple also being in a fixed spacial relationship to the junction of the first thermocouple. Specifically, the second thermocouple is within the thermally controlled environment, but relatively distant from the junction of the first thermocouple. The third thermocouple produces a potential responsive to temperature in the vicinity of the specimen object and has a junction which is removed from both the specimen object and the reference object, and is in a fixed spacial relationship to the junction of the first thermocouple within the thermally controlled environment, but relatively close to the junction of the first thermocouple. The fourth thermocouple produces a potential responsive to temperature in the vicinity of the reference object and has a junction which, like the third thermocouple, is removed from both the specimen object and the reference object. The junction of the fourth thermocouple is in fixed spacial relationship to the junction of the second thermocouple, within the thermally controlled environment, relatively close to the junction of the second thermocouple, the fixed spacial relationship of the fourth thermocouple to the second thermocouple being thermally similar to the fixed spacial relationship of the third thermocouple to the first thermocouple.

By "thermally similar" it is meant that the expected difference in ambient temperature between the location of the first and third thermocouples is similar to the expected difference in ambient temperature between the second and fourth thermocouples, for example, because the physical relationship of the third thermocouple is similar to the first thermocouple to the physical relationship of the fourth thermocouple to the second thermocouple, there being no interferring irregularities in the thermally controlled environment; or else the physical relationship of the third thermocouple to the first thermocouple is different from the physical relationship of the fourth thermocouple to the second thermocouple, the difference in physical relationship being such as to off-set known differences in the thermal environment.

All four thermocouples are connected electrically in series, the thermocouples each having a negative terminal and a positive terminal such that a change in temperature of the junction of each thermocouple produces a change in potential between the positive and negative terminals. The thermocouples are then connected such that in response to changes in temperature in the same direction, the fourth thermocouple produces a change in potential augmenting that of the first thermocouple, and the second and third thermocouples both produce changes in potential in opposition to that produced by the first thermocouple.

The device is also provided with means for measuring the difference in potential between one end of the series of four thermocouples and the other end of the series of four thermocouples, and for interpreting this difference in potential as a temperature differential. The means for measuring the difference in potential and for interpreting the difference as a temperature differential are themslevs known in the art, and do not form a part of the present invention.

As noted above, the present device comprises at least four thermocouples or other thermal sensing elements. Additional pairs of thermocouples may be desirable in order to measure multiple specimen or reference objects, or to more representatively measure the ambient temperatures between locations near the first and second thermocouples.

DETAILED DESCRIPTION

Figure 1:
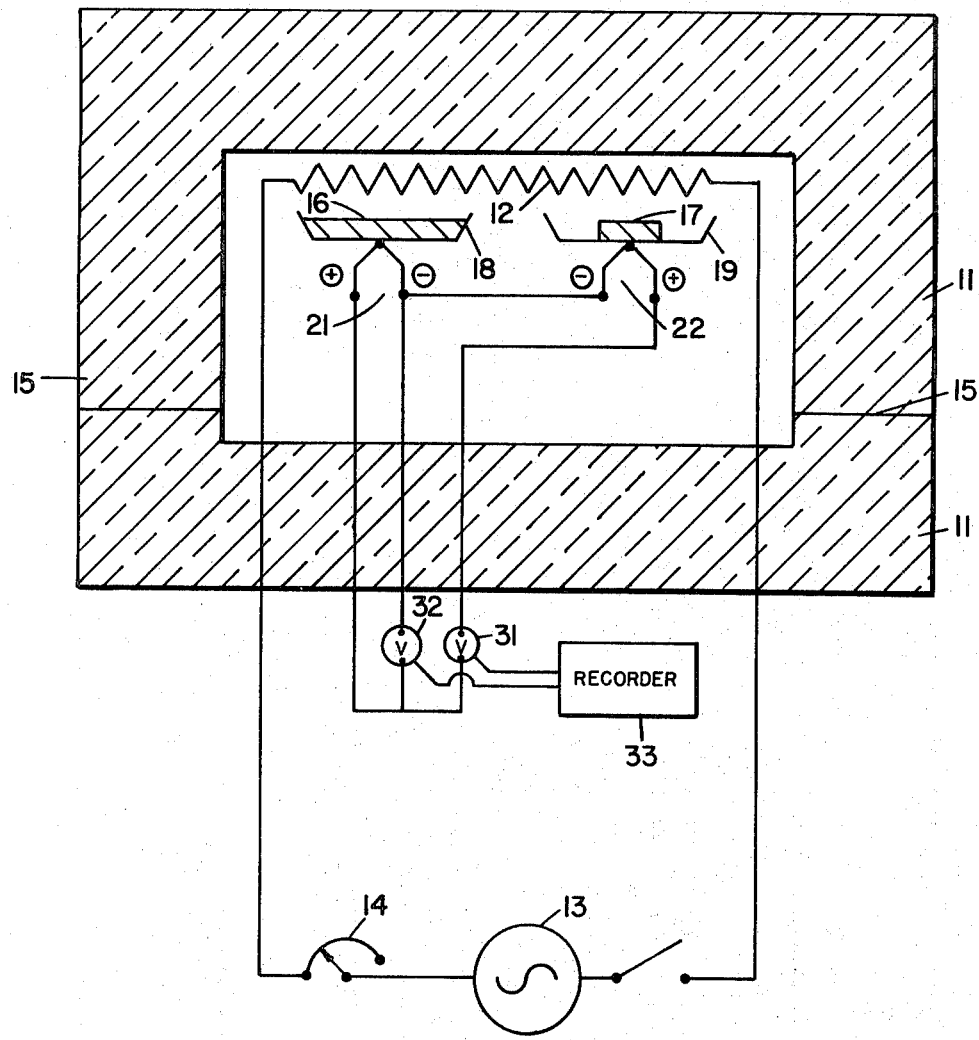
FIG. 1 is an illustration of a conventional differential thermal analyzer (a device for measuring small differences in temperature between a specimen object and a reference object within a thermally controlled environment), illustrating the measurement of small differences in temperature between a specimen object and a reference object, using two thermocouples electrically connected in series, such that changes in temperature of the junctions of both thermocouples, in the same direction, produce changes in potential at the terminals of the thermocouples which are in opposition to each other.

Referring now to FIG. 1, there is illustrated a differential thermal analyzer in accordance with the prior art. The thermally controlled environment (or "furnace") comprises an insulating outer wall 11 and means for thermally controlling the environment within the insulating outer wall 11. The means for controlling the environment is shown schematically as heating resistance 12, power source 13, and rheostat 14.

In place of power source 13 and rheostat 14 a programmer - controller, containing its own thermocouple, can be and more usually is used. The thermocouple of the programmer - controller is in addition to those of the present invention.

The upper portion of the insulating outer wall 11 is removable, illustrated schematically with joints 15. Within the insulating outer wall 11 are a specimen object 16 and a reference object 17. Th specimen object 16 is the object which is to be studied, i.e., the object whose phase change, etc., are to be determined. Referece object 17 is merely a compensating thermal mass which is used in order to provide a base against which the temperature of specimen object 16 can be measured. It is frequently convenient, but not necessary, that the specimen object 16 be contained within a first container 18, and that the reference object 17 be contained within a second container 19 which is thermally similar to the first container 18.

A first thermocouple 21 is provided, thermally in contact with the specimen object 16, either via first container 18 or directly. A second thermocouple 22 is also provided, thermally in contact with reference object 17, either via container 19 or directly. In the case where specimen object 16 is of low thermal mass with respect to containers 18 and 19, the provision of a reference object 17, apart from container 19, may be unnecessary.

Thermocouples 21 and 22 are connected electrically in series, such that in response to changes in temperature in the same direction, thermocouple 21 produces a change in potential in opposition to that produced by thermocouple 22. There is then provided means, such as a first voltmeter 31, for measuring the difference in potential between one end of the pair of thermocouples and the other. There is also provided means for interpreting this difference in potential as a temperature differential, such as a calibration of the voltmeter in degrees. In addition, it may be desirable to provide means for measuring the difference in potential between the positive and negative terminals of the first thermocouple 21 (as shown) of of the second thermocouple 22 (not shown), and for interpreting this differential in potential as a temperature. This can be for example by means of a second voltmeter 32, togother with its own temperature calibration. Thus, the temperature of the thermally controlled invironment within insulating outer wall 11 can be gradually increased by rheostat 14, and the differential in temperature between specimen object 16 and reference 17, as read from voltmeter 31, can be plotted against either the temperature of specimen object 16, as read from voltmeter 32, or against time. In the event that a plot of temperature of specimen object 16 against the differential temperature between specimen object 16 and reference object 17 is desired, the outputs from voltmeters 31 and 32 can be fed to recorder 33 and recorded directly on graph paper. The resultant record can then be interpreted in order to provide the desired information regarding specimen object 16.

The problem with the above scheme, however, is that a small difference in the temperature of the environment of specimen object 16 and reference object 17, unrelated to the phenomenon which is being studied in specimen object 16, can obscure the results of this test. Thus, for example, if the temperature surrounding specimen object 16 is 5° C. greater than the temperature surrounding reference object 17, the differential in voltage registered by voltmeter 31 will reflect not only the changes in the temperature of specimen object 16 which are due to phase changes and the like, which are intended to be measured, but also the extraneous changes in the temperature of the environment. If one attempts to give thermocouples 21 and 22 a more similar environment, by moving them closer together, then one runs the risk of the changes in temperature of specimen object 16, which are intended to be measured, affecting the temperature which is sensed by thermocouple 22.

It is the object of the present invention to solve this problem. The line which is traced by recorder 33 which corresponds to the temperature of specimen object 16 is known as the "baseline" in plots of temperature against temperature differential. Since the present invention compensates for irregularities in this baseline that are produced when the thermally controlled environment is uneven, the invention is termed a "baseline compensator."

Figure 2:
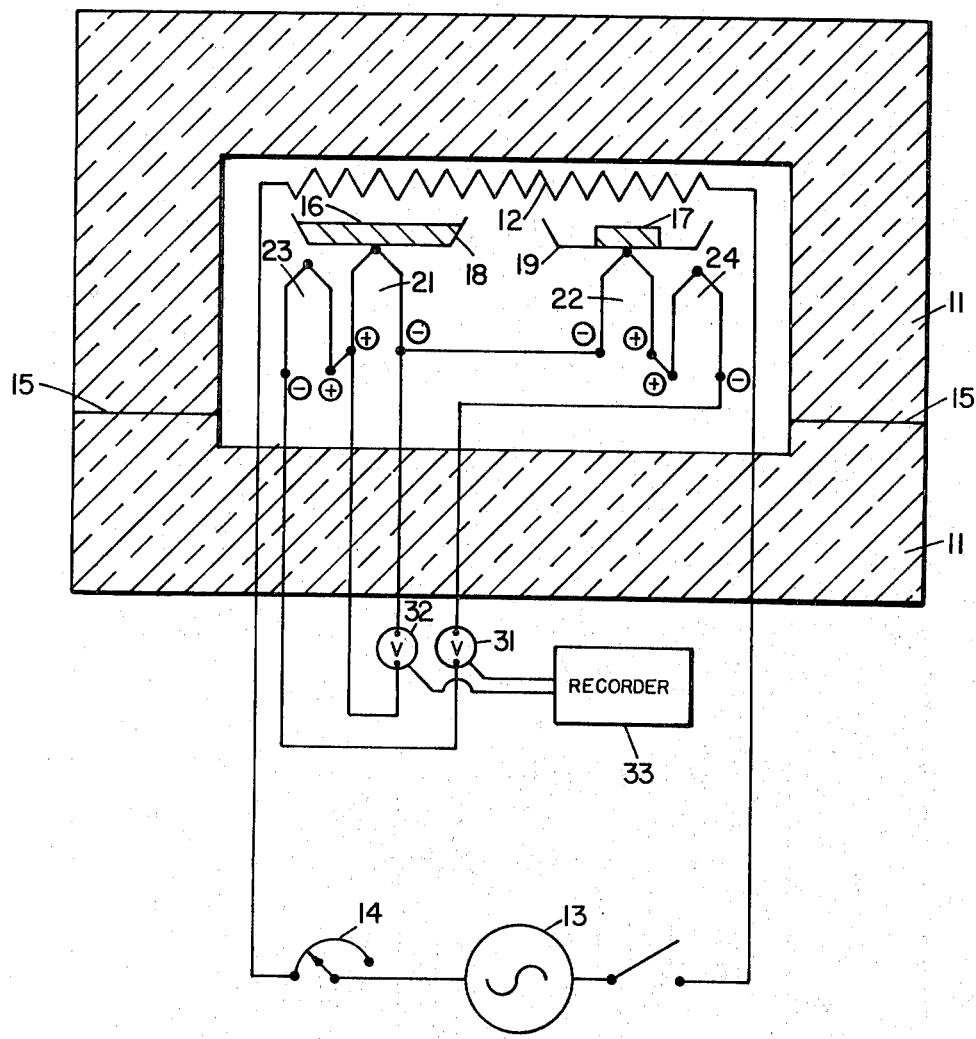
FIG. 2 is an illustration of one embodiment of the present invention, wherein the pair of thermocouples of the prior art is supplemented with a second pair of thermocouples which compensates for differences in temperature between the environments of the first pair of thermocouples.

Referring now to FIG. 2, insulating outer wall 11, heating resistance 12, power source 13, rheostat 14, joints 15, specimen object 16, reference object 17, and containers 18–19 function in the same manner as their counterparts in FIG. 1. As in the device of FIG. 1, a first thermocouple 21 has a junction thermally in contact with the specimen object 16. The second thermocouple 22 has a junction which is removed from the specimen object 16 and thermally in contact with reference object 17, the junction of the second thermocouple 22 being in fixed spacial relationship to the junction of the first thermocouple 21, within the thermally controlled environment within insulating outer wall 11, but relatively distant from the junction of the first thermocouple 21. There is also provided a third thermocouple 23, the junction of which is removed from specimen object 16 and reference object 17, but in fixed spacial relationship to the junction of the first thermocouple 21, within the thermally controlled environment within insulating outer wall 11, and relatively close to the junction of the first thermocouple 21. There is also provided a fourth thermocouple 24, the junction of which is removed from specimen object 16 and reference object 17. The junction of the fourth thermocouple 24 is also in fixed spacial relationship to the junction of the second thermocouple 22, within the thermally controlled environment, and relatively close to the junction of the second thermocouple 22, the fixed spacial relationship of the fourth thermocouple 24 to the second thermocouple 22 being thermally similar to the fixed spacial relationship of the third thermocouple 23 to the first thermocouple 21, as explained above.

Thermocouples 21–24 each have a negative terminal and a positive terminal, which are indicated in FIG. 2. These are characteristic of the metals which are used to form the thermocouples, and by nature of the thermocouple, produce a change in potential between the positive and negative terminals whenever there is a change in temperature applied to the junction of the thermocouple. The four thermocouples 21–24 are then connected electrically in series, such that the desired result is obtained. That is to say, the thermocouples are connected such that the fourth thermocouple 24 produces a change in potential augmenting that of the first thermocouple 21, and the second and third thermocouples 22 and 23 produce changes in potential in opposition to that produced by the first thermocouple 21. This is shown schematically in FIG. 2 by the relative placement of the positive and negative signs on thermocouples 21–24.

The word "thermocouple" is used in this specification as an example of a thermoelectric element most popularly used in differential thermal analyzers, but the invention is also applicable to other thermal sensing elements, such as thermopiles, which produce a potential across their terminals as a function of temperature.

The device of the present invention is next provided with means, such as first voltmeter 31, for measuring the difference in potential between one end of the series of four thermocouples 21–24 and the other end of the series of four thermocouples 21–24. If desired, the device may also be provided with means such as second voltmeter 32 for measuring the difference in potential between the positive and negative terminals of the first thermocouple 21 which is thermally in contact with specimen object 16. In any event, there is also required means for interpreting the difference in potential observed by first voltmeter 31 as a temperature differential. If the temperature of specimen object 16 is desired, there is required means for interpreting the difference in potential observed by second voltmeter 32 as a temperature. As noted above, this can be either by means of calibration of the dial of voltmeters 31 and 32, or by means of recorder 33, which is in itself conventional.

The invention will now be illustrated with an example.

EXAMPLE

A differential thermal analyzer having a DTA 707 furnace module and a TA 700 console, both as produced by the Tem-Pres Research Division of The Carborundum Company, was provided with two containers 18–19, being Pyrex cups, and a series of four thermocouples 21–24, electrically connected in series as shown in FIG. 2. Specimen object 16 was about 12 milligrams of indium metal which was placed in container 18. In view of the small thermal mass of the indium relative to the containers, no reference object 17, other than container 19, was required. The four thermocouples were of the Chromel-Alumel type, in which the positive element is Chromel alloy (approximately 90 percent nickel and 10 percent chromium) and the negative element is Alumel allow (approximately 94 percent nickel with small amounts of silicon, aluminum and manganese).

Figure 3:
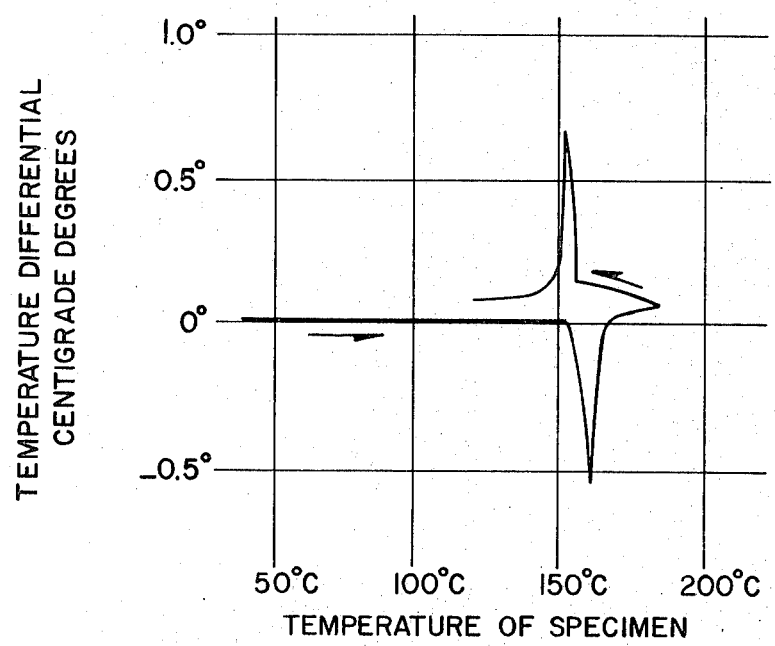
FIG. 3 is an illustration of a thermogram obtained from a device in accordance with the device illustrated in FIG. 2.

The furnace was heated to a temperature of about 185°C at a rate of about 20°C per minute. Recorder 33 recorded as the abscissa, the temperature of the specimen 16 via thermocouple 21; and as the ordinate, the differential temperature via thermocouples 21–24. The result is shown in FIG. 3. The lower curve represents heating and the upper curve cooling. The valley from about 156°C to about 172°C represents the endothermic melting of the indium specimen, and the peak from about 156°C to about 145°C represents the exothermic solidification of the specimen.

Figure 4:
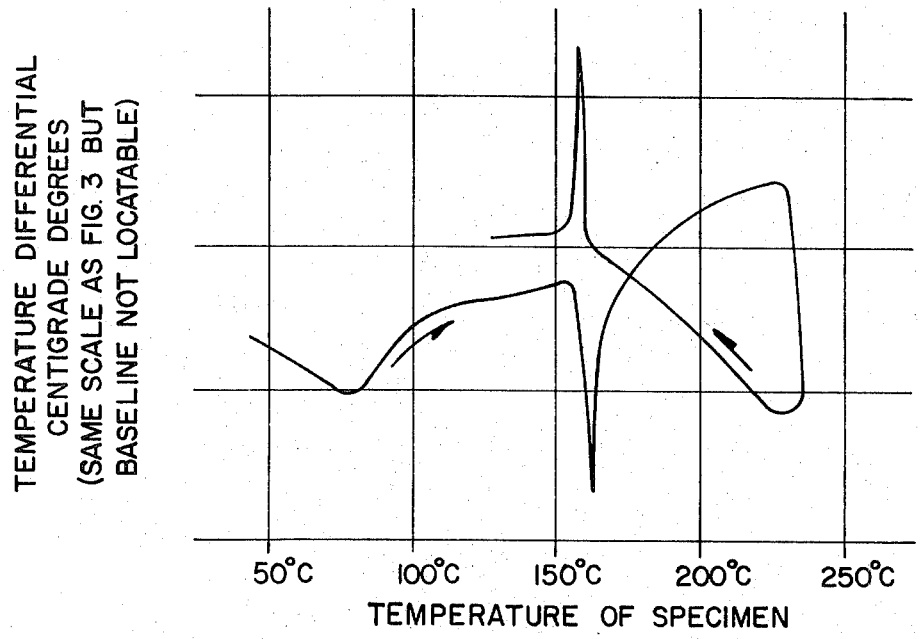
FIG. 4 is an illustration of a thermogram obtained from a device in accordance with FIG. 1.

As a comparison, thermocouples 23 and 24 were removed and the remaining thermocouples 21 and 22 were connected as shown in FIG. 1. The experiment was repeated, except that a maximum temperature of about 235°C was attained. The result is shown in FIG. 4. It can be seen that the baseline is much more erratic with the third and fourth thermocouples not connected, and the resulting plot from the recorder is more difficult to interpret.

Figure 5:
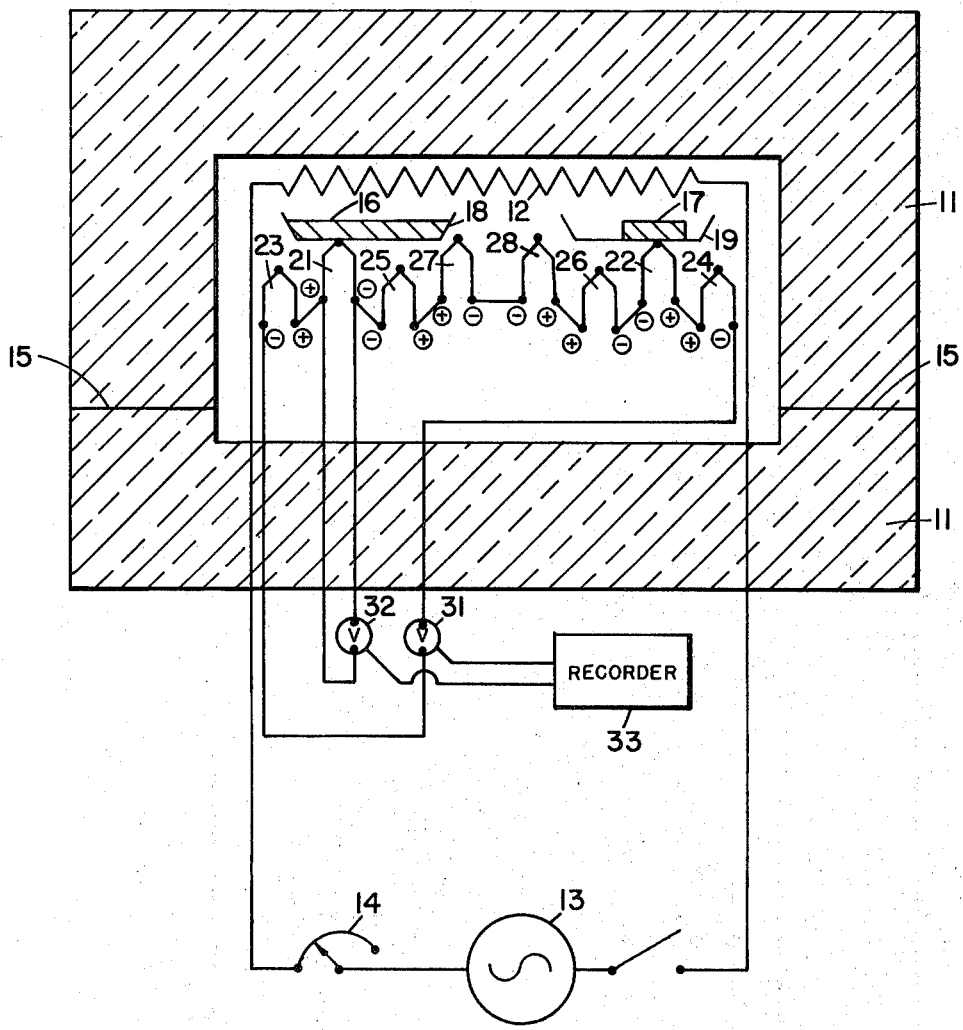
FIG. 5 is an illustration of another embodiment of the present invention, wherein the pair of thermocouples of the prior art is supplemented with a total of three pairs of thermocouples which compensate the differences in temperature between the environments of the first pair of thermocouples.

In FIG. 5 there is illustrated another embodiment of the present invention, wherein the pair of thermocouples 21–22 of the prior art, as illustrated in FIG. 1, is supplemented with a total of three pairs of thermocouples 23–28 which compensate for differences in temperature between the environments of the first pair of thermocouples 21–22. The placement and electrical connection of thermocouples 21–24 is similar to that of the embodiment described above and illustrated in FIG. 2. In addition to the elements there illustrated, however, there are provided four additional thermocouples 25–28.

The fifth thermocouple 25 has its junction removed from the specimen object 16 and the reference object 17, and in fixed spacial relationship to the junction of the first thermocouple 21 within the thermally controlled environment and relatively close to the junction of the first thermocouple 21.

The sixth thermocouple 26 has its junction removed from the specimen object 16 and the reference object 17, and in fixed spacial relationship to the junction of second thermocouple 22, within the thermally controlled environment, relatively close to the junction of the second thermocouple 22, the fixed spacial relationship of the sixth thermocouple 26 being thermally similar to the fixed spacial relationship of the fifth thermocouple 25 of the first thermocouple 21.

The seventh thermocouple 27 has its junction removed from the specimen object 16 and the reference object 17, and in fixed spacial relationship to the junction of the first thermocouple 21, within the thermally controlled environment and relatively close to the junction of the first thermocouple 21.

The eight thermocouple 28 has its junction removed from the specimen object 16 and the reference object 17, and in fixed spacial relationship to the junction of the second thermocouple 22 within the thermally controlled environment and relatively close to the junction of the second thermocouple 22. The fixed spacial relationship of the eighth thermocouple 28 is thermally similar to the fixed spacial relationship of the seventh thermocouple 27 to the first thermocouple 21.

In addition to connecting thermocouples 21–24 electrically in series, this electrical series includes fifth through eighth thermocouples 25–28, as well. Each of these thermocouples 21–28 has a negative terminal, a junction and a positive terminal such that a change in temperature of the junction of each thermocouple produces a change in potential between the positive and negative terminals. The thermocouples are then connected in series such that in response to changes in temperature in the same direction, the sixth and seventh thermocouples 26–27 produce changes in potential augmenting that of the first thermocouple 21, and the fifth and eight thermocouples 25 and 28 both produce changes in potential in opposition to that produced by the first thermocouple 21. As noted above, the fourth thermocouple 24 produces a change in potential augmenting that of the first thermocouple 21, and the second and third thermocouples 22 and 23 both produce changes in potential in opposition to that produced by the first thermocouple 21. This relationship is illustrated in FIG. 5 by the positive and negative signs on each thermocouple.

The device of FIG. 2 is further modified in FIG. 5 in that the means 31 for measuring the difference in potential between one end of the series of four thermocouples 21–24 and the other end of the series of four thermocouples 21–24 is adapted to include not only the net difference produced by thermocouples 21–24, but also the net difference in potential produced by the fifth through eighth thermocouples 25–28. The result is that when thermocouples 23–28 are strategically placed about the thermally controlled environment, as described above, a total of six compensatory readings can be obtained to more distinctly shown the effect of the change in temperature which is desire to be measured, rather than incidental changes in the environment surrounding the specimen object 16 and reference object 17.

Figure 6:
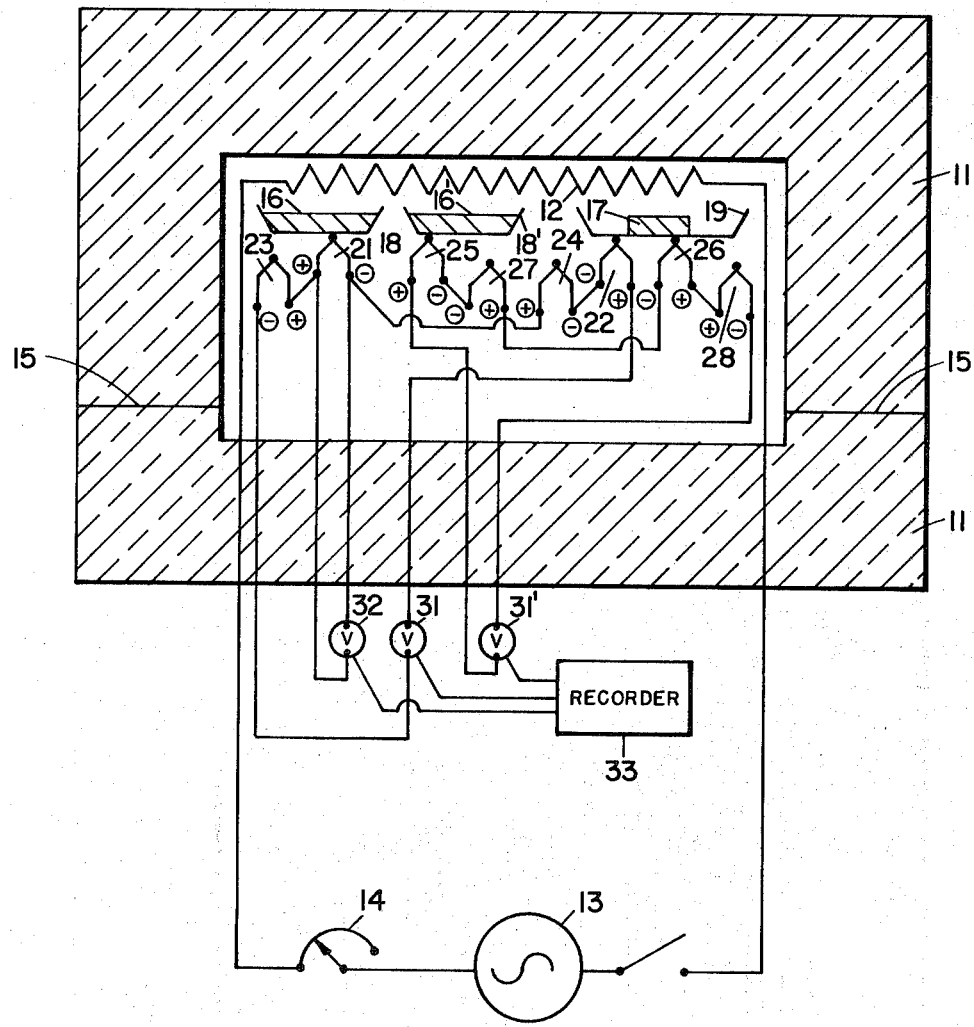
FIG. 6 is an illustration of yet another embodiment of the present invention, adapted for simultaneously measuring small differences in temperature between two specimen objects and a reference object within a thermally controlled environment, comprising two sets of four thermocouples each.

A further embodiment of the present invention is illustrated in FIG. 6. The embodiment of FIG. 6 is adapted for simultaneously measuring small differences in temperature between a first specimen object 16 and a reference object 17, and between a second specimen object 16' and the reference object 17, within a thermally controlled environment. Like the embodiment of FIG. 5, the embodiment of FIG. 6 comprises four thermocouples in addition to those illustrated in FIG. 2. In the case of the device of FIG. 6, however, the junction of the fifth thermocouple 25 is thermally in contact with the second specimen object 16', whose temperature is to be compared with the temperature of the reference object 17 within the thermally controlled environment. The junction of the sixth thermocouple 26 is removed from each of the specimen objects 16 and 16' and is thermally in contact with reference object 17, the junction of the sixth thermocouple 26 being in fixed spacial relationship to the junction of the fifth thermocouple 25, within the thermally controlled environment, but relatively distant from the junction of the fifth thermocouple 25. The seventh thermocouple produces a potential responsive to the temperature in the vicinity of the second specimen object and the junction of the seventh thermocouple 27 is removed from specimen objects 16 and 16' and reference object 17, and in fixed spacial relationship to the junction of the fifth thermocouple 25, within the thermally controlled environment, and relatively close to the junction of the fifth thermocouple 25. The eighth thermocouple produces a potential responsive to the temperature in the vicinity of the reference object and junction of the eighth thermocouple 28 is removed from specimen objects 16 and 16' and reference object 17, and is fixed spacial relationship to the junction of the sixth thermocouple 26, within the thermally controlled environment and relatively close to the junction of the sixth thermocouple 26, the fixed spacial relationship of the eighth thermocouple 28 to the sixth thermocouple 26 being thermally similar to the fixed spacial relationship of the seventh thermocouple 27 to the fifth thermocouple 25.

The device of FIG. 6 is further provided with means connecting the fifth through eighth thermocouples 25-28 electrically in series, the fifth through eighth thermocouple 25-28 each having a negative terminal, a junction and a positive terminal such that a change in temperature of the junction of each thermocouple produces a change in potential between the positive and negative terminals. Thermocouples 25-28 are connected electrically in series such that in response to changes in temperature in the same direction, the eighth thermocouple 28 produces a change in potential augmenting that of the fifth thermocouple 25, and the sixth and seventh thermocouples 26-27 both produce changes in potential in opposition to that produced by the fifth thermocouple 25.

The device of FIG. 6 is further provided with means 31' for measuring the difference in potential between one end of the series of the fifth through eighth thermocouples 25-28 and the other end of the series of the fifth through eighth thermocouples 25-28, and for interpreting said difference in potential as a temperature differential. This means 31', conveniently a voltmeter, is suitably connected to recorder 33, along with means 31 and 32 as illustrated in FIG. 2. The recorder can then interpret these imputs and produce a permanent record, as desired.

Figure 7:
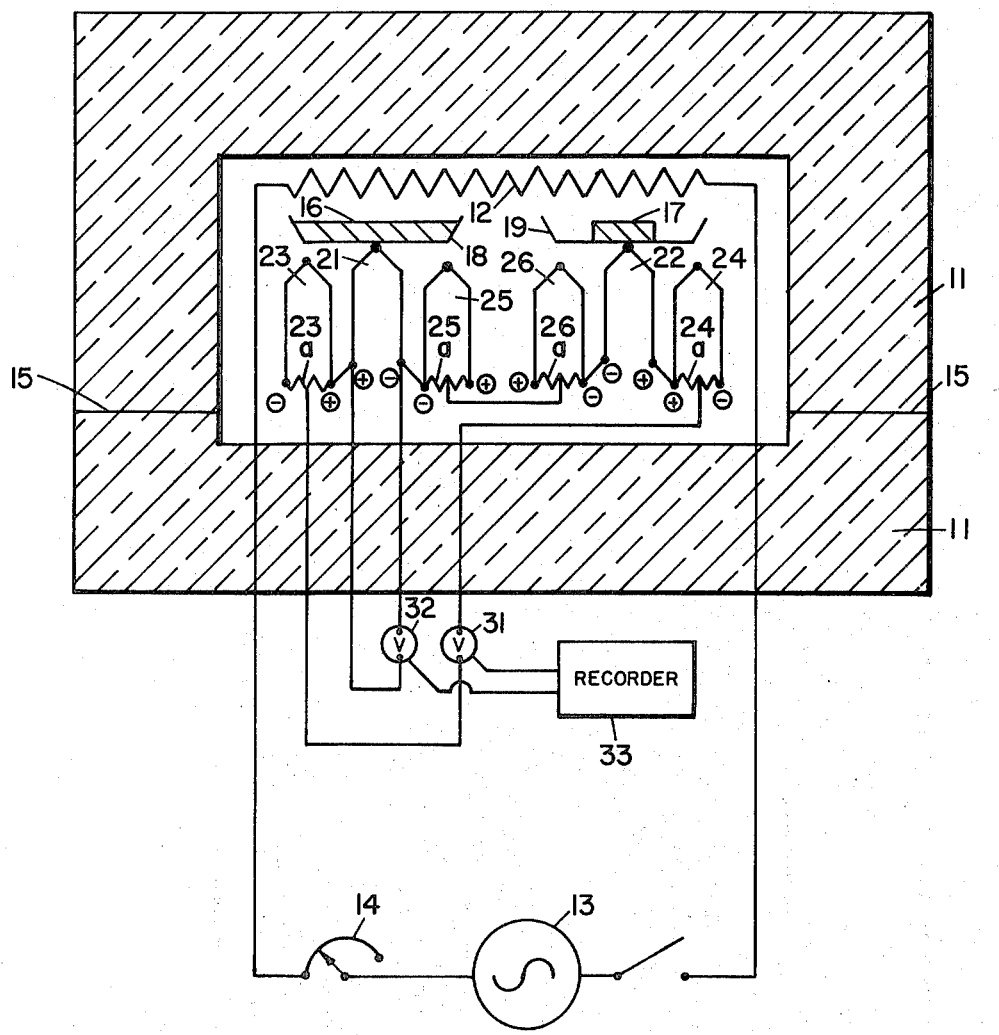
FIG. 7 is an illustration of a further embodiment of the present invention, wherein the four thermocouples as illustrated in FIG. 2 are supplemented with a third pair of thermocouples which aid in compensating for differences in temperature between the environments of the first pair of thermocouples.

A further embodiment of the present invention is illustrated in FIG. 7. This embodiment comprises six thermocouples, connected similarly to those of FIG. 2, but with slight differences. In the embodiment as illustrated in FIG. 7, the four thermocouples 21-24 as illustrated in FIG. 2 are supplemented with a third pair of thermocouples 25-26 which aid in compensating for differences in temperature between the environments of the first pair of thermocouples 21 and 22.

In the device of FIG. 7, the junction of the first thermocouple 21 is thermally in contact with the specimen object 16 whose temperature is to be compared with the temperature of the reference object 17 within the thermally controlled environment. The junction of the second thermocouple 22 is removed from the specimen object 16 but is thermally in contact with reference object 17. The junction of the second thermocouple 22 is also in fixed spacial relationship to the junction of the first thermocouple 21 within the thermally controlled environment, but relatively distant from the junction of the first thermocouple 21.

The junction of the third thermocouple 23 is removed from the specimen object 16 and the reference object 17, and in fixed spacial relationship to the junction of the first thermocouple 21, within the thermally controlled environment and relatively close to the junction of the first thermocouple 21.

The junction of the fourth thermocouple 24 is removed from the specimen object 16 and the reference object 17, and in fixed spacial relationship to the junction of the second thermocouple 22, within the thermally controlled environment and relatively close to the junction of the second thermocouple 22, the fixed spacial relationship of the fourth thermocouple 24 to the second thermocouple 22 being thermally similar to the fixed spacial relationship of the third thermocouple 23 to the first thermocouple 21.

The junction of the fifth thermocouple 25 is removed from the specimen object 16 and the reference object 17 and is fixed spacial relationship to the first thermocouple 21, within the thermally controlled environment and relatively close to the junction of the first thermocouple 21.

The junction of the sixth thermocouple 26 is removed from the specimen object 16 and the reference object 17, and in fixed spacial relationship to the junction of the second thermocouple 22, within the thermally controlled environment and relatively close to the junction of the second thermocouple 22, the fixed spacial relationship of the sixth thermocouple 26 to the second thermocouple 22 being thermally similar to the fixed spacial relationship of the fifth thermocouple 25 to the first thermocouple 21.

In addition to the six thermocouples as described above, the apparatus of FIG. 7 is provided with four resistors, 23a, 24a, 25a, and 26a, the resistances of which are equal, and large relative to the resistances of the thermocouples, bridging the third, fourth, fifth, and sixth thermocouples, 23-26, respectively. Resistors 23a, 24a, 25a, and 26a are maintained in isothermal condition, preferably outside the thermally controlled environment and in contact with an isothermal block. Instead of connecting all six thermocouples entirely in series, in the device of FIG. 7, the first and second thermocouples 21 and 22, which are in thermal contact with specimen object 16 and reference object 17, respectively, are connected in series, and half of each of the resistances 23a-26a, bridging the third, fourth, fifth, and sixth thermocouples, are connected electrically in series with the first and second thermocouples 21 and 22. These six thermocouples 21-26 each have a negative terminal, a junction, and a positive terminal such that a change in temperature of the junction of each thermocouple produces a change in potential between the positive and negative terminals, the thermocouples being connected such that in response to changes in temperature in the same direction, the fourth and sixth thermocouples 24 and 26 produce changes in potential augmenting that of the first thermocouple 21, and the second, third, and fifth thermocouples 22, 23, and 25 each produce changes in potential in opposition to that produced by the first thermocouple 21. This relationship is shown in FIG. 7 by the positive and negative signs associated with each thermocouple.

The device of FIG. 7 is also provided with means 31 for measuring the difference in potential between one end of the series of the first thermocouple 21 and second thermocouple 22 and one-half of each of the resistances 23a, 24a, 25a, and 26a bridging the third, fourth, fifth, and sixth thermocouples 23-26, and for interpreting these differences in potential as a temperature differential. Optionally, but highly preferably, the device is also provided with means 32 for measuring the difference in potential between the positive and negative terminals of the first thermocouple 21 (as shown) or of the second thermocouple 22, and for interpreting this differential in potential as a temperature.

The device of FIG. 7 is therefore an improvement upon the device of FIG. 2, since a greater degree of temperature variance compensation can be obtained; but only six thermocouples need be used, as opposed to the eight thermocouples of FIG. 6.

I claim:

1. A device for measuring small differences in temperature between a specimen object and a reference object within a thermally controlled environment, comprising:

1. a first thermal sensing element which produces a potential across its terminals as a function of temperature, the junction of which first thermal sensing element is thermally in contact with the specimen object whose temperature is to be compared with the temperature of the reference object within the thermally controlled environment;
2. a second thermal sensing element which produces a potential across its terminals as a function of temperature, the junction of which second thermal sensing element is removed from the specimen object and thermally in contact with the reference object, the junction of said second thermal sensing element being in fixed spacial relationship to the junction of the first thermal sensing element, within the thermally controlled environment but relatively distant from the junction of the first thermal sensing element;
3. a third thermal sensing element which produces a potential responsive to the temperature in the vicinity of the speciment object across its terminals as a function of temperature, the junction of which third thermal sensing element is removed from the specimen object and the reference object, the junction of said third thermal sensing element being in fixed spacial relationship to the junction of the first thermal sensing element, within the thermally controlled environment and relatively close to the junction of the first thermal sensing element;
4. a fourth thermal sensing element which produces a potential responsive to the temperature in the vicinity of the reference object across its terminals as a function of temperature, the junction of which fourth thermal sensing element is removed from the specimen object and the reference object, the junction of said fourth thermal sensing element being in fixed spacial relationship to the junction of the second thermal sensing element, within the thermally controlled environment and relatively close to the junction of the second thermal sensing element, the fixed spacial relationship of the fourth thermal sensing element to the second thermal sensing element being thermally similar to the fixed spacial relationship of the third thermal sensing element to the first thermal sensing element;
5. means connecting said first, second, third, and fourth thermal sensing elements electrically in series, the thermal sensing elements each having a negative terminal, a junction, and a positive terminal such that a change in temperature of the junction of each thermal sensing element produces a change in potential between the positive and negative terminals; the thermal sensing elements being connected such that in response to changes in temperature in the same direction, the fourth thermal sensing element produces a change in potential augmenting that of the first thermal sensing element, and the second and third thermal sensing elements both produce changes in potential in opposition to that produced by the first thermal sensing element; and
6. means for measuring the difference in potential between one end of the series of four thermal sensing elements and the other end of the series of four thermal sensing elements, and for interpreting said difference in potential as a temperature differential.

2. A device according to claim 1, comprising in addition means for measuring the difference in potential between the positive and negative terminals of the first thermal sensing element, and for interpreting said difference in potential as a temperature.

3. A device according to claim 1, comprising in addition means for measuring the difference in potential between the positive and negative terminals of the second thermal sensing element, and for interpreting said difference in potential as a temperature.

4. A device according to claim 1, wherein the thermal sensing elements are thermocouples.

5. A device according to claim 4, comprising in addition
1. a fifth thermocouple, the junction of which fifth thermocouple is removed from the specimen object and the reference object, the junction of said fifth thermocouple being in fixed spacial relationship to the junction of the first thermocouple within the thermally controlled environment and relatively close to the junction of the first thermocouple;
2. a sixth thermocouple, the junction of which sixth thermocouple is removed from the specimen object and the reference object, the junction of said sixth thermocouple being in fixed spacial relationship to the junction of the second thermocouple, within the thermally controlled environment, and relatively close to the junction of the second thermocouple, the fixed spacial relationship of the sixth thermocouple to the second thermocouple being thermally similar to the fixed spacial relationship of the fifth thermocouple to the first thermocouple;
3. a seventh thermocouple, the junction of which seventh thermocouple is removed from the specimen object and the reference object, the junction of the seventh thermocouple being in fixed spacial relationship to the junction of the first thermocouple, within the thermally controlled environment and relatively close to the junction of the first thermocouple;
4. an eighth thermocouple, the junction of which eighth thermocouple is removed from the specimen object and the reference object, the junction of said eighth thermocouple being in fixed spacial relationship to the junction of the second thermocouple within the thermally controlled environment and relatively close to the junction of the second thermocouple, the fixed spacial relationship of the eighth thermocouple to the second thermocouple being thermally similar to the fixed spacial relationship of the seventh thermocouple to the first thermocouple;
5. said fifth, sixth, seventh, and eighth thermocouples being electrically connected in series with said first, second, third, and fourth thermocouples, the thermocouples each having a negative terminal, a junction, and a positive terminal such that a change in temperature of the junction of each thermocouple produces a change in potential between the positive and negative terminals; the thermocouples being connected such that in response to changes in temperature in the same direction, the sixth and seventh thermocouples produce changes in potential augmenting that of the first thermocouple, and the fifth and eighth thermocouples both produce changes in potential in opposition to that produced by the first thermocouple;

6. said means for measuring the difference in potential between one end of the series of four thermocouples and the other end of the series of four thermocouples being adapted to include the net difference in potential produced by the first through the eighth thermocouples.

6. A device according to claim 4, adapted for simultaneously measuring small differences in temperature between a first specimen object and a reference object, and between a second specimen object and the reference object, within a thermally controlled environment, comprising in addition 1. a fifth thermocouple, the junction of which fifth thermocouple is thermally in contact with the second specimen object whose temperature is to be compared with the temperature of the reference object within the thermally controlled environment;
2. a sixth thermocouple, the junction of which sixth thermocouple is removed from each specimen object and thermally in contact with the reference object, the junction of said sixth thermocouple being in fixed spacial relationship to the junction of the fifth thermocouple, within the thermally controlled environment, but relatively distant from the junction of the fifth thermocouple;
3. a seventh thermocouple which produces a potential responsive to the temperature in the vicinity of the second specimen object, the junction of which seventh thermocouple is removed from each specimen object and the reference object, the junction of said seventh thermocouple being in fixed spacial relationship to the junction of the fifth thermocouple, within the thermally controlled environment and relatively close to the junction of the fifth thermocouple;
4. an eighth thermocouple which produces a potential responsive to the temperature in the vicinity of the reference object, the junction of which eighth thermocouple is removed from each specimen object and the reference object, the junction of said eighth thermocouple being in fixed spacial relationship to the junction of the sixth thermocouple, within the thermally controlled environment and relatively close to the junction of the sixth thermocouple, the fixed spacial relationship of the eighth thermocouple to the sixth thermocouple being thermally similar to the fixed spacial relationship of the seventh thermocouple to the fifth thermocouple;
5. means connecting said fifth, sixth, seventh, and eighth thermocouples electrically in series, the fifth, sixth, seventh, and eighth thermocouples each having a negative terminal, a junction and a positive terminal such that a change in temperature of the junction of each thermocouple produces a change in potential between the positive and negative terminals, the thermocouples being connected such that in response to changes in temperature in the same direction, the eighth thermocouple produces a change in potential augmenting that of the fifth thermocouple, and the sixth and seventh thermocouple both produce changes in potential in opposition to that produced by the fifth thermocouple; and
6. means for measuring the difference in potential between one end of the series of the fifth through eighth thermocouples and the other end of the series of the fifth through eighth thermocouples, and for interpreting said difference in potential as a temperature differential.

7. A device for measuring small differences in temperature between a specimen object and a reference object within a thermally controlled environment, comprising:

1. a first thermocouple, the junction of which first thermocouple is thermally in contact with the specimen object whose temperature is to be compared with the temperature of the reference object within the thermally controlled environment;
2. a second thermocouple, the junction of which second thermocouple is removed from the specimen object and thermally in contact with the reference object, the junction of said second thermocouple being in fixed spacial relationship to the junction of the first thermocouple, within the thermally controlled environment but relatively distant from the junction of the first thermocouple;
3. a third thermocouple, the junction of which third thermocouple is removed from the specimen object and the reference object, the junction of the third thermocouple being in fixed spacial relationship to the junction of the first thermocouple, within the thermally controlled environment and relatively close to the junction of the first thermocouple;
4. a fourth thermocouple, the junction of which fourth thermocouple is removed from the specimen object and the reference object, the junction of said fourth thermocouple being in fixed spacial relationship to the junction of the second thermocouple, within the thermally controlled environment, and relatively close to the junction of the second thermocouple, the fixed spacial relationship of the fourth thermocouple to the second thermocouple being thermally similar to the fixed spacial relationship of the third thermocouple to the first thermocouple;
5. a fifth thermocouple, the junction of which fifth thermocouple is removed from the specimen object and the reference object, the junction of said fifth thermocouple being in fixed spacial relationship to the first thermocouple, within the thermally controlled environment and relatively close to the junction of the first thermocouple;
6. a sixth thermocouple, the junction of which sixth thermocouple is removed from the specimen object and the reference object, the junction of said sixth thermocouple being in fixed spacial relationship to the junction of the second thermocouple, within the thermally controlled environment and relatively close to the junction of the second thermocouple, the fixed spacial relationship of the sixth thermocouple to the second thermocouple being thermally similar to the fixed spacial relationship of the fifth thermocouple to the first thermocouple;
7. four resistors, the resistances of which are equal and large relative to the resistances of the thermocouples, bridging the third, fourth, fifth, and sixth thermocouples, respectively; said resistors being maintained in an isothermal condition;

8. means connnecting the first and second thermocouples, and half of each of the resistances bridging the third, fourth, fifth, and sixth thermocouples, electrically in series, the thermocouples each having a negative terminal, a junction, and a positive terminal such that a change in temperature of the junction of each thermocouple produces a change in potential between the positive and negative terminals; the thermocouples being connected such that in response to changes in temperature in the same direction, the fourth and sixth thermocouples produce changes in potential augmenting that of the first thermocouple, and the second, third, and fifth thermocouples each produce changes in potential in opposition to that produced by the first thermocouple; and 9. means of measuring the difference in potential between one end of the series of the first thermocouple, the second thermocouple, and one half of each of the resistances bridging the third, fourth, fifth, and sixth thermocouples, and for interpreting said difference in potential as a temperature differential.

8. A device according to claim 1, comprising in addition a first container containing the specimen object and a second container thermally similar to the first container and containing the reference object, the second container being thermally in contact with the second thermocouple.

9. A process for measuring small differences in temperature between a specimen object and a reference object within a thermally controlled environment, comprising:

1. positioning a first thermocouple, so that the junction of the first thermocouple is thermally in contact with the specimen object whose temperature is to be compared with the temperature of the reference object within the thermally controlled environment;

2. positioning a second thermocouple, so that the junction of the second thermocouple is removed from the specimen object and thermally in contact with the reference object, the junction of the second thermocouple being in fixed spacial relationship to the junction of the first thermocouple, within the thermally controlled environment but relatively distant from the junction of the first thermocouple;

3. positioning a third thermocouple for producing a potential responsive to the temperature in the vicinity of the specimen object, so that the junction of the third thermocouple is removed from the specimen object and the reference object, and in fixed spacial relationship to the junction of the first thermocouple, within the thermally controlled environment and relatively close to the junction of the first thermocouple;

4. positioning a fourth thermocouple for producing a potential responsive to the temperature in the vicinity of the reference object, so that the junction of the fourth thermocouple is removed from the specimen object and the reference object, and in fixed spacial relationship to the junction of the second thermocouple, within the thermally controlled environment and relatively close to the junction of the second thermocouple, the fixed spacial relationship of the fourth thermocouple to the second thermocouple being thermally similar to the fixed spacial relationship of the third thermocouple to the first thermocouple;

5. connecting said first, second, third, and fourth thermocouples electrically in series, the thermocouples each having a negative terminal and a positive terminal such that a change in temperature of the junction of each thermocouple produces a change in potential between the positive and negative terminals; the thermocouples being connected such that in response to changes in temperature in the same direction, the fourth thermocouple produces a change in potential augmenting that of the first thermocouple, and the second and third thermocouples both produce changes in potential in opposition to that produced by the first thermocouple;

6. measuring the difference in potential between one end of the series of four thermocouples and the other end of the series of four thermcouples; and 7. interpreting said measured difference in potential as a temperature differential.

10. A process according to claim 9, comprising in addition 1. measuring the difference in potential between the positive and negative terminals of the first thermocouple, and 2. interpreting said difference in potential as a temperature.

11. A process according to claim 9, comprising in addition 1. measuring the differential in potential between the positive and negative terminals of the second thermocouple, and 2. interpreting said difference in potential as a temperature.

* * * * *